United States Patent
Ambekar

(10) Patent No.: US 10,713,741 B1
(45) Date of Patent: Jul. 14, 2020

(54) METHOD AND SYSTEM FOR NEGOTIATING DISCOUNT OFFER AND GENERATING DISCOUNT COUPONS OVER A NETWORK

(71) Applicant: Ashwin Ambekar, San Jose, CA (US)

(72) Inventor: Ashwin Ambekar, San Jose, CA (US)

( * ) Notice: Subject to any disclaimer, the term of this patent is extended or adjusted under 35 U.S.C. 154(b) by 312 days.

(21) Appl. No.: 14/731,869

(22) Filed: Jun. 5, 2015

(51) Int. Cl.
  *G06Q 50/18* (2012.01)
  *G06Q 30/02* (2012.01)
  *G06Q 50/00* (2012.01)

(52) U.S. Cl.
  CPC ....... *G06Q 50/188* (2013.01); *G06Q 30/0236* (2013.01); *G06Q 50/01* (2013.01)

(58) Field of Classification Search
  CPC ... G06Q 50/188; G06Q 30/0236; G06Q 50/01
  See application file for complete search history.

(56) References Cited

U.S. PATENT DOCUMENTS

| | | | | |
|---|---|---|---|---|
| 2009/0307143 A1* | 12/2009 | Reistad | ................ | G06Q 30/06 705/80 |
| 2012/0209686 A1* | 8/2012 | Horowitz | ................ | H04L 67/02 705/14.26 |
| 2013/0188217 A1* | 7/2013 | Kluth | ................ | G06F 8/61 358/1.14 |
| 2013/0226686 A1* | 8/2013 | Grossman | ................ | G06Q 30/02 705/14.27 |
| 2014/0222478 A1* | 8/2014 | Wang | ................ | G06Q 10/06311 705/7.13 |
| 2014/0316875 A1* | 10/2014 | Tkachenko | ................ | G07F 11/002 705/14.25 |
| 2014/0316928 A1* | 10/2014 | Springer | ................ | G06Q 30/0611 705/26.4 |

(Continued)

OTHER PUBLICATIONS

Su et al. An Internet-based negotiation server for e-commerce. Aug. 2, 2001. Springer-Verlag. The VLDB Journal 10: 72-90. (Year: 2001).*

*Primary Examiner* — William A Brandenburg
*Assistant Examiner* — Christopher C Busch
(74) *Attorney, Agent, or Firm* — Kanika Radhakrishnan; Evergreen Valley Law Group

(57) ABSTRACT

A method and system for negotiating discount offers and generating discount coupons over a network. The method includes establishing an offer channel for secure communication between one or more users and a plurality of businesses over a network. The method also includes permitting the businesses to publish offers. Further, the method includes issuing a private identity and a public identity to the users of the channel, wherein the private identity is a unique and secure identifier to the user profile and the public identity is a public locator to the users profile as a short Uniform Resource Locator. Furthermore, the method includes allowing the users to interact and negotiate with the businesses for a suitable coupon offer. Moreover, the method includes transmitting the offer and offer entitlement corresponding to the public identity of the user, redemption center and to the business. The method also includes permitting the users to avail the coupon by providing the public identity at the redemption center thereby providing a better experience to the user.

17 Claims, 9 Drawing Sheets

(56) References Cited

U.S. PATENT DOCUMENTS

2015/0032819 A1* 1/2015 Veenstra ................. H04L 67/22
　　　　　　　　　　　　　　　　　　　　　709/204
2016/0078461 A1* 3/2016 Kang .................. G07F 17/3255
　　　　　　　　　　　　　　　　　　　　　705/14.12

* cited by examiner

METHOD AND SYSTEM FOR NEGOTIATING DISCOUNT OFFER AND GENERATING DISCOUNT COUPONS OVER A NETWORK

TECHNICAL FIELD

Embodiments of the disclosure relate generally to the field of discount coupons. Embodiments relate more particularly for negotiating discount offers and generating discount offer coupons over public computer networks such as Internet.

BACKGROUND

In general, a coupon is a voucher or a certificate entitling the holder to a particular discount offer described or referenced by the coupon. Coupons have been around for over 150 years. Discount coupons have been used by businesses to market their products and services. Traditionally, coupons were printed and distributed to users. With digital revolution, coupon has changed its form and has become digital. Whether digital or printed, coupons can be taken to redemption center such as retail store, website or phone ordering system. These redemption centers provide discount to the user based on coupon terms and applicability. While the traditional method has been effective, there are many pitfalls to the entire process.

Coupon providers distribute coupons using delivery mechanisms like mail, newspaper inserts, door-to-door delivery or other publications. The user has to cut the coupons, sort them based on interest or need and then clip it and take it to a redemption center such as retail store, website or phone ordering system for purchase. This process is inconvenient to the user. During a purchase, the user has to take out the product (or store) specific coupons and use the coupons for making the purchase to avail the discount. The redemption center has to collect all redeemed coupons and send it to a coupon clearing house for reimbursement. Coupon clearing is full of hassles and is very expensive.

Print coupons are inconvenient for users, redemption centers and issuers. The user has to find coupons manually and carry them. Getting too many unwanted coupons turns out to be a bad user experience. The user may end up trashing all the coupons they receive (wanted and unwanted). The redemption center has to manually keep track of all coupons accepted and process for reimbursement. Besides providing credit in the form of a discount to the user, the redemption center has to take the extra effort to get it reimbursed. For the coupon issuer there is an additional overhead of processing reimbursements. Reimbursements process is typically outsourced to coupon clearing houses, which make process costly for the issuer. The issuer does not know the end customer and does not have any other effective mechanism to re-engage the user. Most importantly, the issuer does not know if the user liked the coupon and whether the user will make the purchase. There is no way to predict how many coupons to print and how many will get redeemed. Also, paper based coupons are not ecologically friendly and they are also not effective in stopping fraudulent usage.

In the past, efforts have been made to create loyalty programs that work across multiple merchants and allow merchants to create and issue coupons to the users of the loyalty program. While this approach has helped user receive coupon offers from multiple businesses, this approach does not allow users to interact and negotiate the offer with businesses. Also, loyalty programs have to share user data with the merchants which may create privacy issues for the users.

Digital coupons have gained popularity with the arrival of the Internet and mobile technology. At present, technology offers paperless coupon solutions. Moreover, there are various advancements made in context of digital coupon technology to protect misuse of digital coupons. Existing methods aim to provide communication systems for digital coupons, providing solutions for issuing, distributing and redeeming coupons. Digital coupons provide better organization and more ecological solution. With mobile internet access, users can now have access to coupons anywhere they go. Despite their advantages, digital coupons in the current form are only digital translation of existing paper based coupon functionality. The approaches taken in past does not provide solutions to existing problems like engaging customers and business interactively, providing effective solution to drive repeat business and restricting fraudulent usage without compromising on privacy of the user.

In the light of the above discussion, there appears to be a need for a more efficient, easy method and system for generating discount coupons.

OBJECTIVE OF INVENTION

The principal objective of the embodiments herein is to provide an interactive offer negotiation between the user and the business thereby providing entitlement to offer coupon to the user based on negotiated terms of the offer.

Another objective of the embodiments herein is to provide a convenient, hassle-free and privacy awareness mechanism for the user to avail coupon benefits without carrying the actual coupon to the redemption center. This is achieved by using a unique public identity and private identity approach to the user profile and associating all coupon entitlements to the public identity of the user. Every user is expected to have a unique public identity and a unique private identity, collectively referred to as the unique identity.

Yet, another objective of the embodiments herein is to improve effectiveness of the discount offer based promotions for the business without compromising on the user data privacy aspect.

Yet, another objective of the embodiments herein is to provide efficient and secure mechanism for businesses and redemption center to allow issuing, redemption and clearing of the offer coupons.

Yet, another objective of the embodiments herein is to reduce fraudulent usage of the coupons and help in reducing cost and time for coupon clearing.

SUMMARY

The above-mentioned needs are met by a method and a system for negotiating discount offers and generating discount coupons over a network.

An example of a method for negotiating discount offers and generating discount coupons over a network includes establishing an offer channel for secure communication between one or more users and a plurality of businesses over a network. The method further includes permitting the businesses to publish offers. Furthermore, the method includes issuing a private identity and a public identity to the users of the channel, wherein the private identity is a unique and secure identifier to the user profile and the public identity is a public locator to the users profile as a short Uniform Resource Locator. Moreover, the method includes allowing the users to interact and negotiate with the businesses for a suitable coupon offer and transmitting the offer and offer entitlement corresponding to the public identity of the user, to the redemption center and to the business. The method also includes permitting the users to avail the coupon by providing the public identity at the redemption center thereby providing a better experience to the user.

An example of a system for negotiating discount offers and generating discount coupons over a network includes a network. Further, the system includes a an offer channel using the network to facilitate secure communication between one or more users and a plurality of businesses, permitting the businesses to publish offers and allowing the users to interact and negotiate with the businesses for a suitable coupon offer. Furthermore, the system includes one or more redemption centers to provide the users to avail the coupon with the public identity thereby providing a better experience to the user. Moreover, the system includes one or more businesses and a plurality of users.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a method and system negotiating discount offer and generating discount coupons over a network. The following detailed description is intended to provide example implementations to one of ordinary skill in the art, and is not intended to limit the invention to the explicit disclosure, as one of ordinary skill in the art will understand that variations can be substituted that are within the scope of the invention as described.

System Block Diagram

Figure 1:
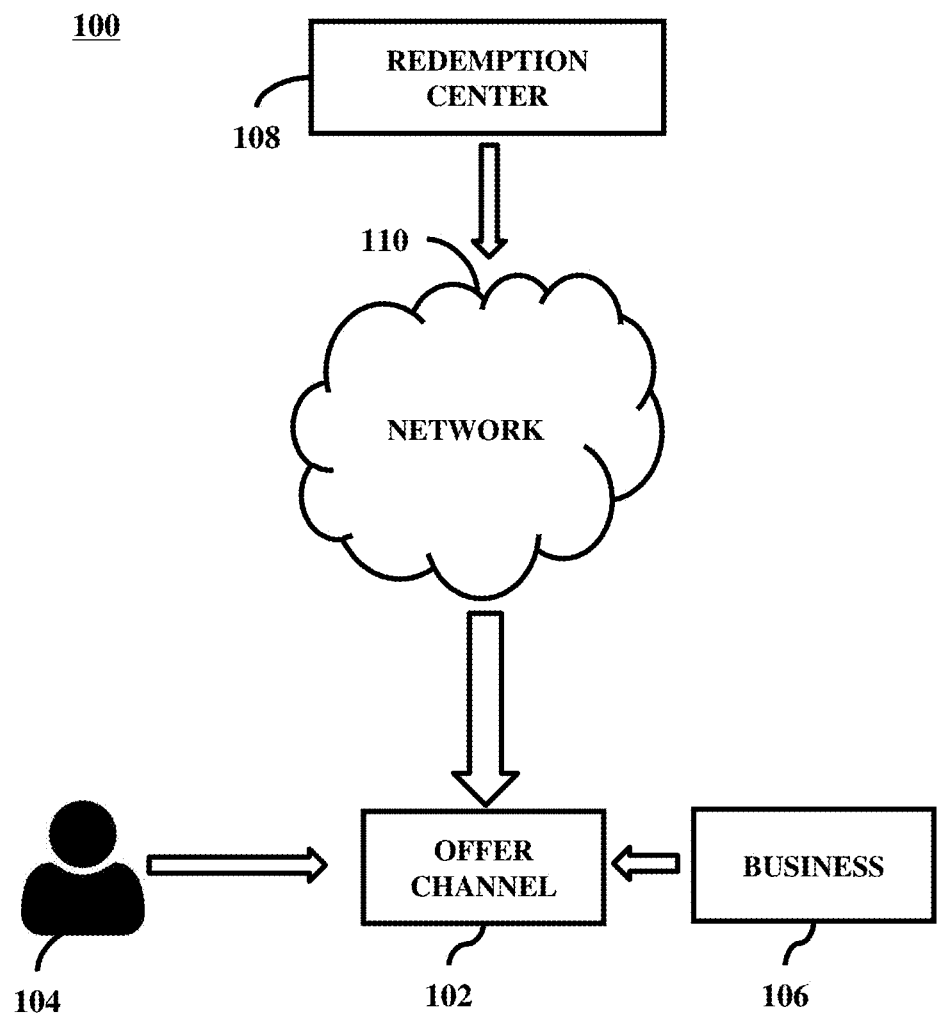
FIG. 1 is a block diagram of the environment, according to the embodiments as disclosed herein.

FIG. 1 is a block diagram of the environment, according to the embodiments as disclosed herein. The environment 100 shows an offer channel 102 using a network 110, a user 104, a business 106 and a redemption center 108.

In preferred embodiments, the environment 100 includes a plurality of users 104 and a plurality of businesses 106.

The offer channel 102 allows one or more business 106 to publish offers and to accept user responses to negotiate the offers using the network 110.

Examples of network 110 include a local area network (LAN), a wide area network (WAN), the Internet, mobile telephone networks, Plain Old Telephone Service (POTS) networks, and wireless data networks (e.g. WiFi and WiMAX networks).

Examples of the redemption center include, but are not limited to, a retail store, a website or a phone ordering system. The redemption center provides discount to the user based on coupon terms and applicability.

In some embodiments, in the case of local and small businesses, the redemption center 108 and the business 106 can be the same.

The environment 100 ensures a privacy aware mechanism for users to interact with the businesses. The present invention makes it convenient for the users to visit the redemption center without any printed or digital coupon for redeeming the discounts. Further, the present invention transforms the entire coupon eco-system into a hassle-free, paper-less and environment friendly system.

The Business 106, the consumer 104 and the redemption center 108 are together referred to as the consuming entities. Further, interactions between the channel and the consuming entities are referred to as actions and can be implemented as Application Programming Interface, Web Service, Web Portal, Desktop Application, Mobile or Handheld applications and so on. It will be appreciated for those skilled in the art that, the interactions may vary with devices used by the consuming entities.

The Offer channel is created by businesses. In some embodiments, coupon distribution agencies may also create Offer Channel and allow registration of business customers.

A business 106 registers with the offer channel and subsequently publishes offers to users. The business 106 issues coupons at the instance when the user completes the negotiation or when the user initiates some event (for example, a purchase made by the user with public identity). The user 104 subscribes to the offer channel 102 and interacts with the business 106 for a suitable coupon offer. The user 104 is provided with a public identity and a private identity profile. All coupon entitlements and actions are done in context of the public identity. The coupon assigned to the user is issued specifically for the public identity. Once the coupon entitlement is granted, the user can visit the redemption center and avail the coupon.

A list of actions and their significance is as follows:

1. Create Action: The businesses that own the Offer Channel creates the channel by implementing the "Create" action. However, owning the Offer Channel may involve overheads. As a result, many businesses may opt for agencies owning channels and allow business customers to register to use channel in shared mode.

2. Register Action: When businesses do not have dedicated channel, they can register with the channels provided by coupon distribution agencies. This action allows businesses to register with the Offer Channels of the coupon distribution agencies. Agencies owning the channel must approve the register action, for the business registration to be successful.

3. Add Offer Action: Allows businesses to create and add offers on the channel for users to view and negotiate.

4. Negotiate Action: Allows businesses and consumers to negotiate offer terms. On a successful negotiation, business can issue the coupon to the consumer based on mutually agreeable offer terms.

5. Reports Action: Allows businesses to obtain several reports on Offers, Coupons, Terms, Usage, Redemption and so on.

6. Redeem Action: The action allows the redemption center to accept a coupon for a unique identity and provide the discount to the consumer. Further, the action allows businesses to either redeem or revert redeem action for a coupon as part of administrative action.

7. Coupon Clearing Action: Allows businesses to process coupon clearing specific tasks.

8. List coupons Action: Permits the Redemption center to list coupons for a specific unique identity on all or specific channels.

The Redemption center 108 uses the "Register" action to register. In some embodiments, the Redemption center registration may be done using system initiated calls.

The usage of actions by users are as follows:

a. The users use "Subscribe" action to subscribe to a channel of interest.

b. After subscription to a specific channel, the user uses "List Offers" action to view all available offers on the channel.

c. The user then utilizes the "Favorite" action to indicate a like or a dislike for the channel or for an offer on the channel.

d. Subsequently, the user uses "List Entitlements" to view entitlement to offers on all or a desired channel.

e. Users make use of the "Negotiate" action on an offer to negotiate offer terms with the issuing business.

f. At the Redemption center, the user uses the "Redeem" action to redeem an offer.

g. Users can further use the "Reporting" action to see usage history, negotiations, coupon entitlements and so on.

Block Diagram of System Modules

Figure 2:
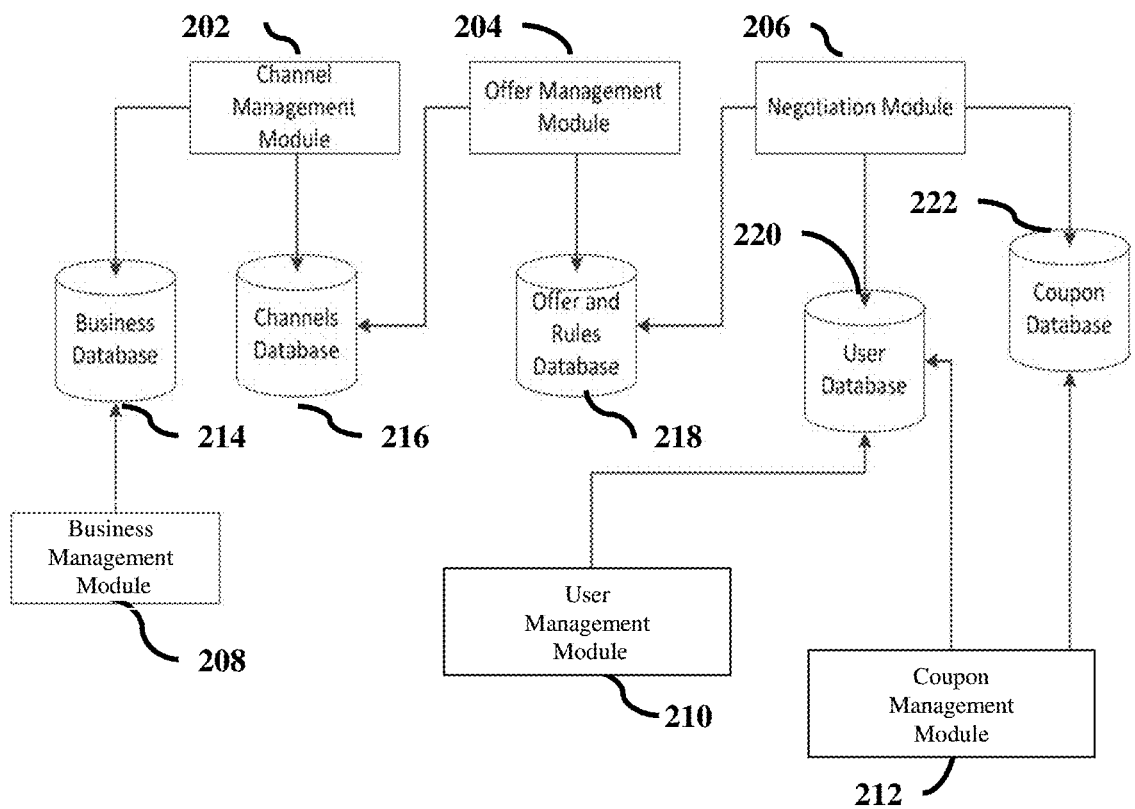
FIG. 2 is a block diagram illustrating the modules and databases that contribute to the system, according to the embodiments as disclosed herein.

FIG. 2 is a block diagram illustrating the modules and databases that contribute to the system, according to the embodiments as disclosed herein. The system includes a channel management module 202, offer management module 204, negotiation module 206, business management module 208, user management module 210 and coupon management module 212.

The business management module 208 is coupled to a business database 214. Business management module 208 captures business details, contact points, performs validations for the businesses and establishes contracts with the businesses. The business management module 208 captures all business details, contacts, contracts and historical transactions in the business database 214.

The channel management module 202 is coupled to the business database 214 and a channels database 216. The channel management module 202 allows businesses to create the offer channels, where business offers are published. The channels database 216 captures the offer channels, their association with businesses, association with offers, historical transactions and properties (such as popularity).

The offer management module 204 is coupled with the channels database 216 and an offer and rules database 218. The offer management module 204 allows the businesses to publish offers on the offer channels. Further, the Offer Management module 204 allows businesses to set-up rules and templates for negotiation. The offer and rules database 218 captures the details of the offer, association with the business, historical transactions, counter-offer details, negotiation rules, negotiation templates, clearing details for issued coupons and properties.

The User Management Module 210 allows users to register, create profile and unique ID. Further, the User Management Module 210 also provides a mechanism to validate user contact points and user using social media profiles. Furthermore, the User Registration Module 210 stores user profile details, social media profiles, private and public identifiers, offer channel subscriptions, redemption details, preferences and transaction history in the User database 220.

The negotiation module 206 is coupled to the Offer and Rules Database 218, a user database 220 and a coupon database 222. The negotiation module 206 is responsible for allowing the negotiation between the user and the business for the offer published on the channel. The negotiation module 206 facilitates the negotiation of terms for an offer between user and the business based on the rules setup in the offers and Rules database 218. Negotiation module may refer to user preferences and profile decisions for negotiating the offer with business (e.g. if user's birthday is in the current month, negotiate extra discount from the business for the user). On successful negotiation, negotiation module 206 will store the offer terms and coupon entitlement for the user in the coupon database. The coupon database 222 stores issued coupons, offer terms, user association, business associations, transaction history, coupon redemption details and offer association.

The Coupon Redemption Module 212 is coupled to the coupon database 222 and user database 220. The Coupon Redemption Module 212 allows users to redeem the coupon at the coupon redemption center. Further, the Coupon Redemption Module 212 also provides clearing capabilities for redemption center to claim the discounts and handles costs to the issuing businesses. The issuing businesses can view the redemptions, discounts availability and handling costs.

Figure 3:
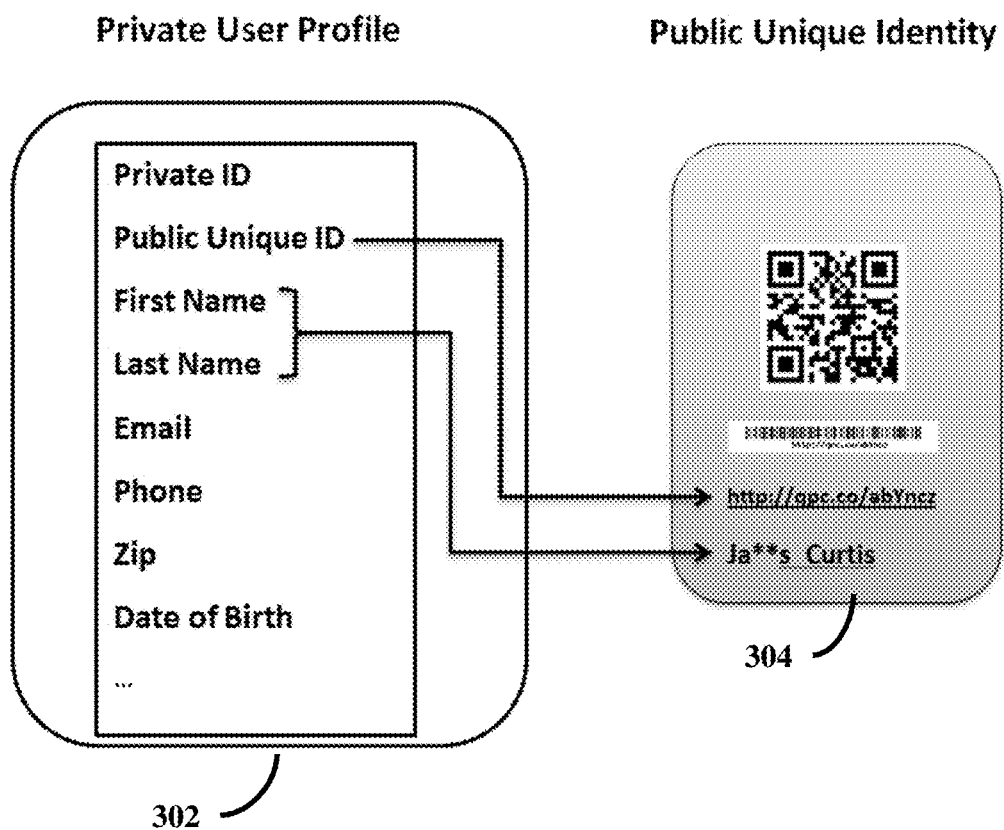
FIG. 3 is a schematic representation of user profile and unique identity, according to the embodiments as disclosed herein.

FIG. 3 is a schematic representation of user profile and unique identity, according to the embodiments as disclosed herein.

The user profile 302 is kept private and includes a private identity, a public unique identity, first name, last name, email, phone, zip, date of birth and other details of the user. The public unique identity in the user profile 302 is linked with a Uniform Resource Identifier (URL) associated with the public unique identity 304. The URL is represented as one of a bar code and a QR code. Further, the public unique identity 304 displays the first name and last name on the public unique identity 304.

The user profile 302 is created after successful registration and the unique identity 304 is assigned to the user profile 302. The user profile 302 is always kept private and only the user is allowed to view and modify the user profile 302. The negotiation system reads the user profile 302 for negotiations on behalf of the user. For example, the business may allow additional discount to a user celebrating birthday in that current month. The negotiation system can identity such users and offer them additional discounts without disclosing the user's identity with the business.

The unique identity (also referred to as a public unique identifier) 304 is composed of a short alpha numeric code appended to a short URL (for example, http://qpc.co/). The short URL represents the issuer system and a short alphanumeric code ("abYncz") represents the unique identity of the user.

The user can share the unique public identity 304 with business for availing the coupon. The unique identity can be represented in the form of a machine scan-able Barcodes (for example, QR code and Code 128-B).

The user can carry the unique identity in digital or printed form containing URL along with the barcode as a public identification. In some embodiments, the user can print it on mobile case, on a wrist watch band/fitness band, attach it to a keychain, carry it as a printed card or carry it in a digital form on a hand-held device.

Figure 4:
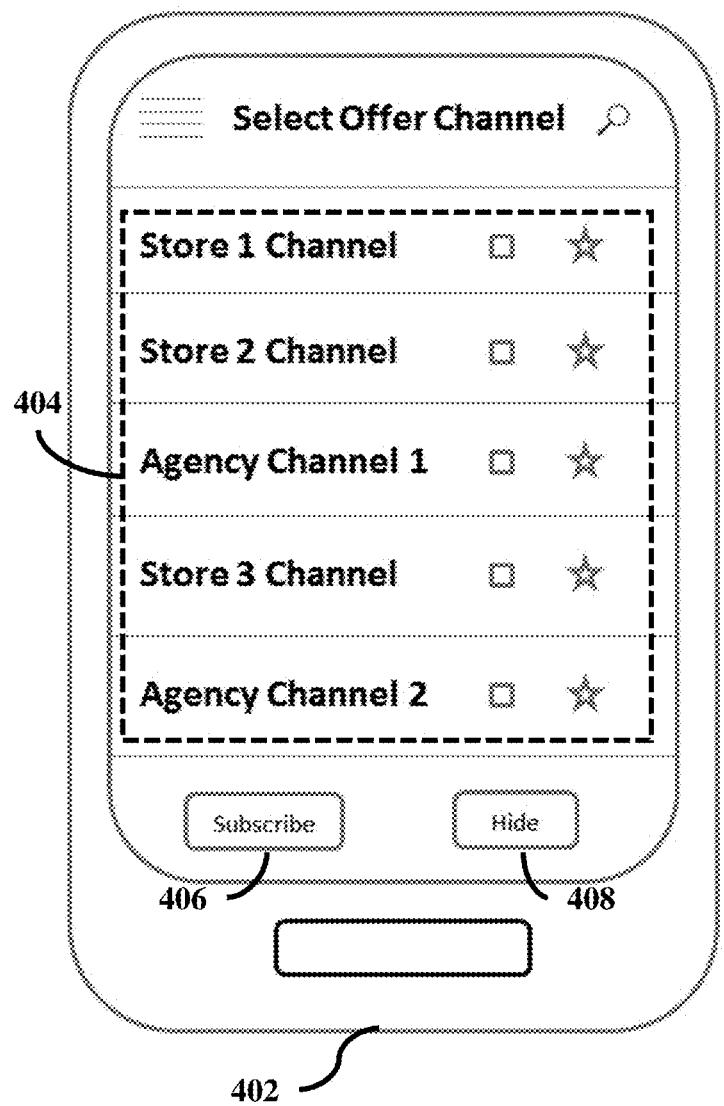
FIG. 4 is a schematic representation of offer channel selection view on a handheld device used by a user, according to the embodiments as disclosed herein.

FIG. 4 is a schematic representation of channel selection view on a handheld device used by a user, according to the embodiments as disclosed herein.

The businesses publish their offers on the channel for users to view and respond using a negotiation request.

The user can browse the available channels as displayed in 404 from businesses and various agencies. Further, the user can select a desired channel and subscribe 406 to receive offers. The user can decide to hide 408 a channel or rate the channel using the "Favorite" menu displayed next to channel selection.

Figure 5:
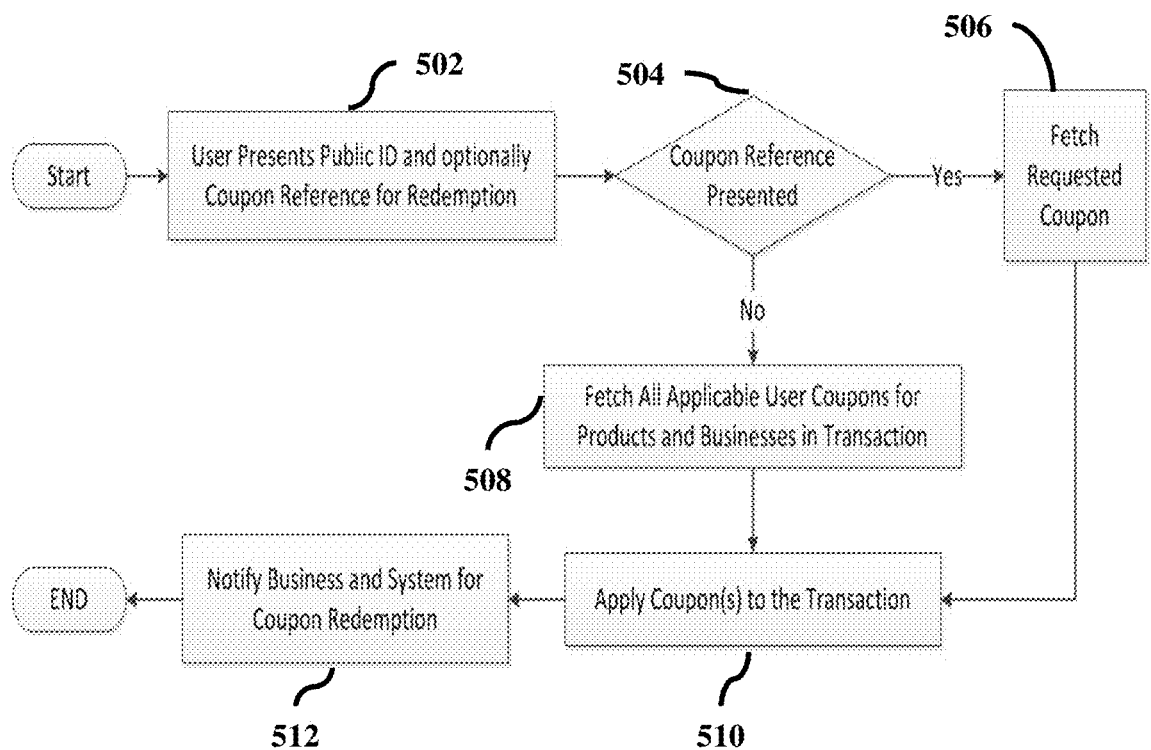
FIG. 5 is a flow chart illustrating the coupon redemption process, according to the embodiments as disclosed herein.

FIG. 5 is a flow chart illustrating the coupon redemption process, according to the embodiments as disclosed herein.

Once a coupon is issued and the user receives the confirmation for coupon entitlement, the user can redeem the coupon discount by visiting the Redemption center.

At step 502, the user visits the Redemption center and presents the Unique ID (Public ID) assigned to the user.

At step 504, the user can optionally provide the coupon reference received as part of the acknowledgement. Subsequently, step 506 is performed.

At step 506, the requested coupon is fetched and applied to the transaction.

At step 508, in case the user does not provide reference, the Redemption center retrieves all the coupons from registered businesses for the redemption center.

At step 510, all the coupons are applied to the transaction. All coupons are evaluated for a possible match against the products/services being purchased by the user and optionally against the manufacturer of the product and services. In case of multiple matches or in case of conflicts, user input is requested in selecting the coupon(s) from the list of coupons. In case the user provides the reference for the coupon along with unique ID, only that coupon is retrieved for applying the discounts. Applicable coupon is applied and evaluated for discounts based on the terms of the coupon.

At step 512, business and user are notified on successful coupon redemption. Coupon is also marked as redeemed/used on the channel, which updates the negotiation system database. Redemption center must provide user invoice records for example, invoice number, coupons availed, discounts processed and total invoice amount for recording in to the systems. These are shared with user (user history) and with issuing businesses for processing coupon clearing and paying redemption center.

Further, several approaches exist to fetch and apply the coupons:

1. Approach 1: All coupons are fetched for a specific Unique ID across all registered channels and coupons are matched at the Redemption center.
2. Approach 2: All cart products (and manufactures) are retrieved and coupons that match the products are fetched.
3. Approach 3: As each product is scanned, query coupons are matched to products and subsequently the unique ID is provided. Any store coupons associated with redemption center business entity is fetched.

Typically, the redemption process may vary based on the type of the coupon. The coupon can be a store coupon or a manufacturer coupon. Further, the redemption process may also vary based on where the coupon can be redeemed, for example, by store or store head quarter or by a retail chain. The redemption process with the variation is further described in conjunction with FIG. 6.

Figure 6:
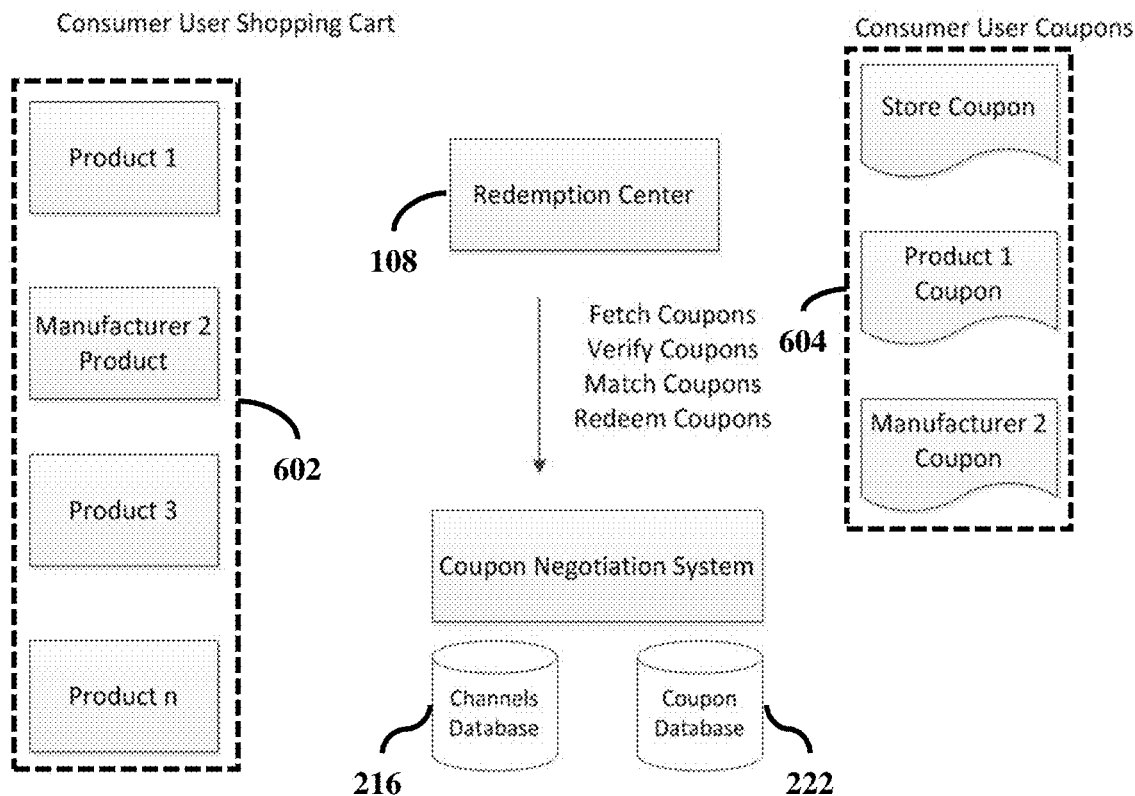
FIG. 6 is a schematic representation of a combination of the redemption center with store coupon for a single user, according to the embodiments as disclosed herein.

FIG. 6 is a schematic representation of a combination of the redemption center with store coupon for a single user, according to the embodiments as disclosed herein. The variation described in FIG. 5 is illustrated in FIG. 6 wherein the Redemption center is a retail chain 604 processing multitude of manufacturer coupons and possibly combined with store (retail chain) 602 coupons for a consumer.

The Redemption center 108 performs several actions on the Coupon Negotiation System. The Coupon Negotiation System interfaces with the Channels Database 216 and Coupon Database 222. The actions include fetching coupons, verifying coupons, matching coupons and redeeming coupons.

Figure 7:
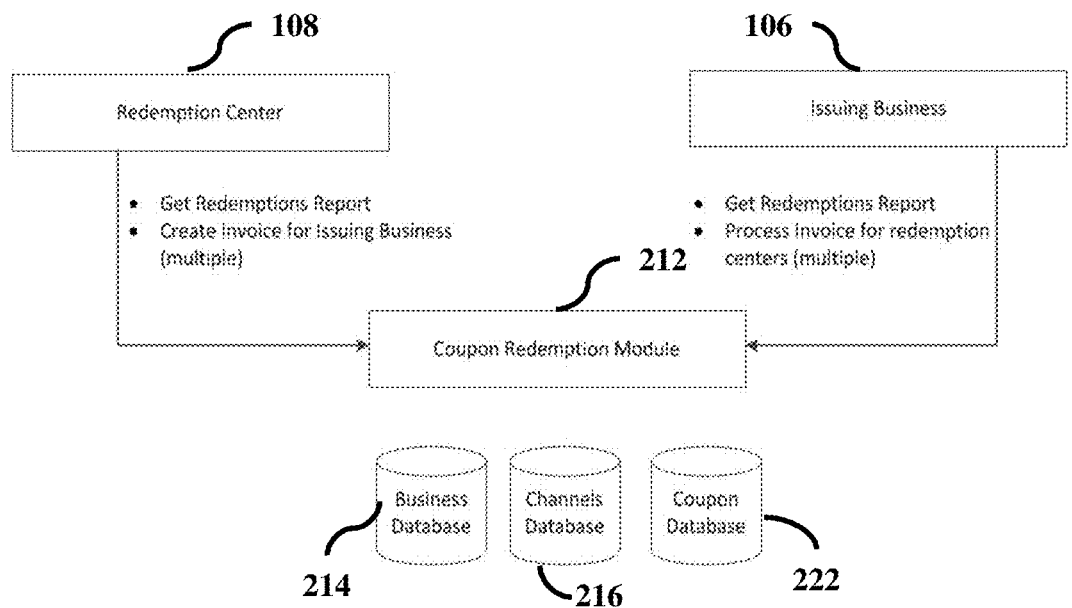
FIG. 7 is a block diagram illustrating an overview of clearing process, according to the embodiments as disclosed herein.

FIG. 7 is a block diagram illustrating an overview of clearing process, according to the embodiments as disclosed herein. The Redemption center 108 can process the requests based on each issuing business 106 since coupon issuing and redemptions are recorded in real-time. Further, the Redemption center 108 fetches details on total redemptions, discounts offered and handing costs for each business 106. The Redemption center 108 issues invoice to the business 106 using the system. The invoice will represent all the details. On the other hand, the businesses 106 validate records for each Redemption center 108, can review invoices and pay the Redemption center 108.

The Redemption center 108 and the issuing business 106 are coupled with the Coupon Redemption Module 212. The Coupon Redemption Module 212 interfaces with the Business Database 214, Channels Database 216 and the Coupon Database 222.

Figure 8:
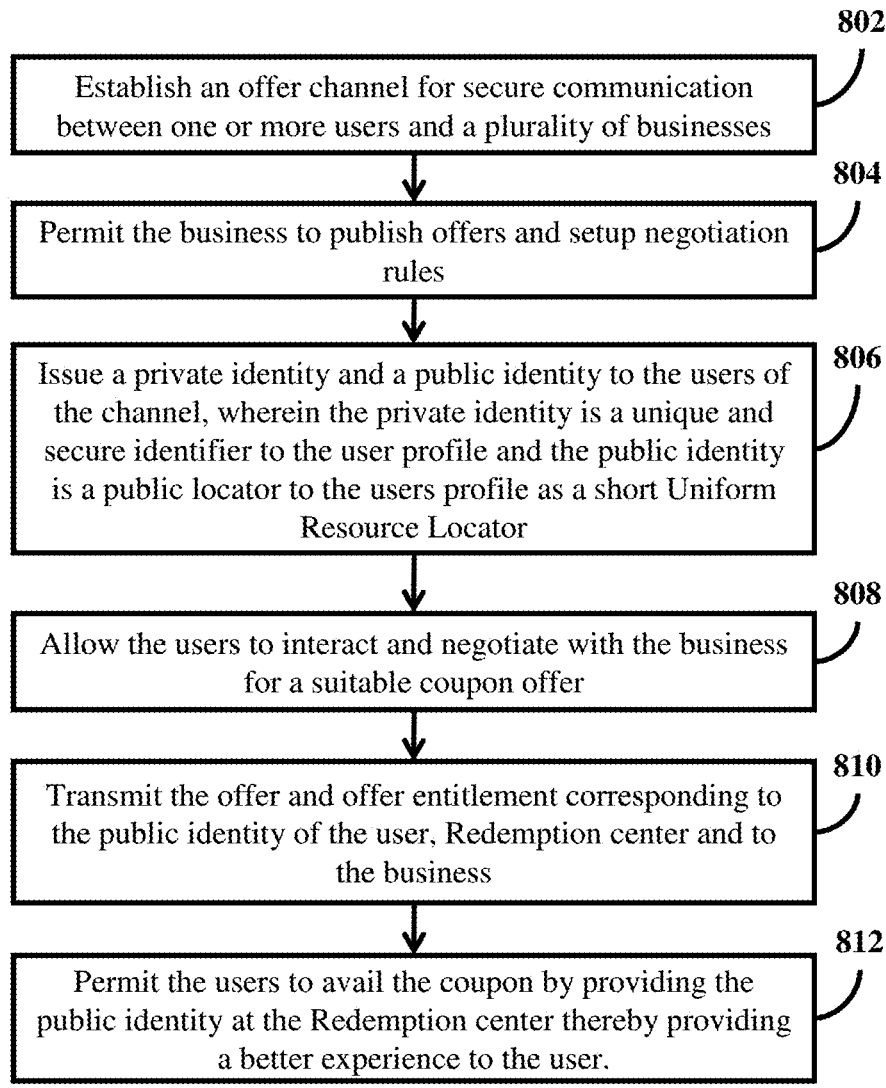
FIG. 8 is a flow chart describing a method for negotiating discount offers and generating discount coupons over a network, according to the embodiments as disclosed herein.

FIG. 8 is a flow chart describing a method for negotiating discount offers and generating discount coupons over a network, according to the embodiments as disclosed herein. The method begins at step 802.

At step 802, an offer channel is established for secure communication between one or more users and a plurality of businesses. In order to create an offer, the businesses must create the offer channel or register with an existing offer channel. A list of businesses and channels available for subscription are then displayed.

Businesses create offers by defining a discount, limits, validity and conditions. For example, an offer defining "Buy One Get One Free during this Memorial Day Weekend, offer valid only on in-store items". Here, "Buy One" defines the limit and "Get One Free" defines the discount/offer. Further, "during this Memorial Day Weekend" defines the validity period/duration, "offer valid only on in-store items" defines the condition.

One or more users are allowed to subscribe to the offer channel and interact with the businesses for a suitable coupon offer. The user is allowed to perform a plurality of actions. The actions include viewing offers published on the channel, rating the channel with likes and dislikes, identifying a channel as favorite, negotiating the offer terms with offer publisher on the channel and allow one of accepting, countering and declining an offer.

Primarily, a user registers in order to interact with the coupon negotiator system. As a part of the registration process, the user fills details in a registration form including personal details. The personal details includes, but is not limited to, Full Name, Email Address, Date/Month of Birth, Mailing Address, Phone Number, Marital Status and Anniversary Date/Month. A few details are mandatory such as, Full Name, Email and Phone. Subsequently, the user submits the registration form to the system for processing; a verification code is created and sent to the user. The user then submits the verification code to the system to prove identity and to validate the locators. The user completes the verification process by verifying the linking and social media identity (for example, Facebook, Twitter and Google). The user is allowed to login to social media system using the login or validation application programming interfaces (APIs) provided by respective systems. Upon social media verification, a unique identity for the user is created and registered in the system.

At step 804, permit the business to publish offers.

Once the business publishes offer on the channel, it is visible to consumers who have subscribed to the channel. Users will be able to view all valid offers and can perform operations. The users can favorite an offer or can start the negotiation.

When an offer is published by the business on the channel, the user has option to review. The user can decide to act if the offer is interesting. If terms of the offer (limit, discount, duration and conditions) are acceptable to the user, he can accept the offer. Once the offer is accepted, negotiation system will record the offer terms and will create the coupon for the user. This coupon may be shared with business and redemption center if connected and if they are accepting coupon feed. User will be notified of coupon entitlement grant. Once coupon is issued, user can visit redemption center to redeem the coupon discount.

If the offer is for a product, then the product identity is linked to the offer. Subsequently, a business identity is added to the offer. The next step is to define negotiation rules. Finally, the offer is published on the channel.

During the creation of offers, negotiation rules are also setup. In some embodiments, the businesses may choose for automatic negotiation. Manual negotiation requires negotiation template setup.

The automated negotiation process primarily defines the acceptance rule for any counter offer from consumer. The offer may allow negotiation based on multiple offer terms, in which case acceptance rules will be a complex set of combination rules involving offer terms. The acceptance rule may include a range of acceptable values of offer terms (limit, discount, validity and conditions). Further, the acceptance rule provides decision making for any counter offer received from the user.

Consider a scenario where the business desires to give additional discount or benefit to the user via coupon. The business can set up exception rules based on the user profile and history information. Further, the exception rules include limiting values around user profile attributes. However, the actual user profile and values of the attributes used for the limiting values will not be shared with the business. Consequently, the exception rules will be evaluated when the acceptance rules fail the evaluation criteria. Typically, the exception rules allow better negotiation without sharing the user profile and history information of the user.

In some embodiments, offer negotiation may include sequence of counter-offers from users and businesses. In cases where acceptance and exception rules does not produce acceptance of the offer, qualification rules are applied by the business. The qualification rules check if a counter offer can be provided. Here, the semantics of qualification rules depends on negotiable offer terms and acceptance rules.

For both automated and manually negotiated offers, business needs to setup or select appropriate negotiation template for the users. For automated negotiations, the template is derived from the acceptance and exception rules. The template is used for displaying the counter-offer, acceptance values for other terms and so on.

Business can also control the actions user can perform against an offer or a counter offer, for example the business may not allow user to submit counter-offer after two rounds of counter offers. In such a case, after two rounds, user will not see any option to negotiate. Further, options to accept and decline could be provided to user by the business in such a scenario.

If original offer terms are not acceptable to the user and negotiation option is made available, user can submit a counter-offer to the business. Once the counter offer is submitted business can review the terms and if acceptable business will accept and will issue the coupon as described above. Though, if terms are not acceptable, business can evaluate the qualification rule to decide whether to negotiate or not. If no further negotiation is to be done, business declines the counter offer and negotiation ends. If business decides to counter the offer, it can evaluate new counter-offer using qualification rules and can send the counter-offer to the user. User can review the counter offer and can take decisions as described earlier for the business offer.

At step 806, issue a private identity and a public identity to the users of the channel, wherein the private identity is a unique and secure identity and the public identity is a public locator to the users profile as a short Uniform Resource Locator.

At step 808, the user is allowed to interact and negotiate with the business for a suitable coupon offer.

Once the offer is created, the businesses can link the product or business identification (for example, UPC code or other identification) with the offer. Upon creation of the offer, negotiation rules can be defined on the offer terms, for example, discount, limit, validity and condition. Once offer and negotiation rules are defined, business can publish the offer for customers to view and negotiate. The rules are ordered in sequence for interpretation.

After the negotiation is complete and the business accepts the offer, coupon is added to the coupon database. Coupon details and entitlement is sent to the business. If the business accepts online notification, coupon entitlement is sent to the business. Alternatively, the business needs to query the coupon from the coupon management system. The user history and preference are updated and the coupon entitlement notification is sent to the user. Once the coupon is issued and the user receives the confirmation for coupon entitlement, the user can redeem the coupon discount by visiting redemption center.

Typically, after the offer is created on the channel, the user reviews the offer terms. If the terms are acceptable, the user accepts the offer. Subsequently, coupon entitlement is granted to the user. Alternatively, if the terms are not acceptable, the user begins negotiation. The user submits the counter offer and the business reviews the counter offer. At this instance, if the terms are acceptable, the business accepts counter offer. Subsequently, coupon entitlement is granted.

After negotiation, the user is intimated on the entitlement to the offer, while the coupon is directly submitted to the business (and optionally to redemption center).

At step 810, the offer is transmitted and offer entitlement corresponding to the public identity of the user, Redemption center and to the business. The user is notified about the entitlement to the offer and how to redeem. The Redemption center can query in real time for a missing coupon.

The coupon is stored in the coupon database and may be notified to the business. In such a case, the coupon is sent to the business. Subsequently, user attributes and history are updated and notified to the user.

At step 812, the users are permitted to avail the coupon by providing the public identity at the Redemption center thereby providing a better experience to the user. The user is allowed to select a desired coupon from among multiple coupons.

User only needs to show his/her unique identity to redemption center and issued coupon will be applied. Since coupons are directly submitted to business (and optionally to redemption center), invention also helps avoid the coupon clearance process overheads. There is no need for user to carry coupon to redemption centers. User identity is represented as digital or physical card (if user prefers physical print form), which can be used at all redemption centers and for all entitled offers, making is very simple and easy for the user. In case business or redemption centers do not have acknowledgement of the coupon issued, system provides mechanism for both to query the coupon on behalf of the user.

Coupons are of different types. Store coupons are issued by respective stores and are valid only in the store. In the case of a sequence of stores, the issuing store and the redeeming store may vary. Similarly, for manufacturer coupons, product manufacturers create the coupons to promote their products. Upon agreement with location stores and retail businesses (including chains), discount coupons are redeemed. The manufacturers pays fee for passing coupons along with the discount value to the Redemption center.

The method ends at step 812.

The present invention is beneficial for several reasons, as listed below:
1. Convenient to the users to visit the Redemption center and avail the coupon.
2. Convenient to the user to visit the Redemption center without any printed or digital coupon for claiming the discounts.
3. Transforms the entire coupon eco-system in to a hassle-free, paper-less and environment friendly system.
4. Useful for businesses to attract more customers and improve coupon utilization.
5. Reduces costs associated with the coupons.
6. Ensures privacy of user data.
7. Engages both the user and the business, thereby making it more appealing for users.
8. Restricts fraudulent usage by implementing real-time authorization.
9. Provides real-time coupon creation, entitlement and redemption.

Figure 9:
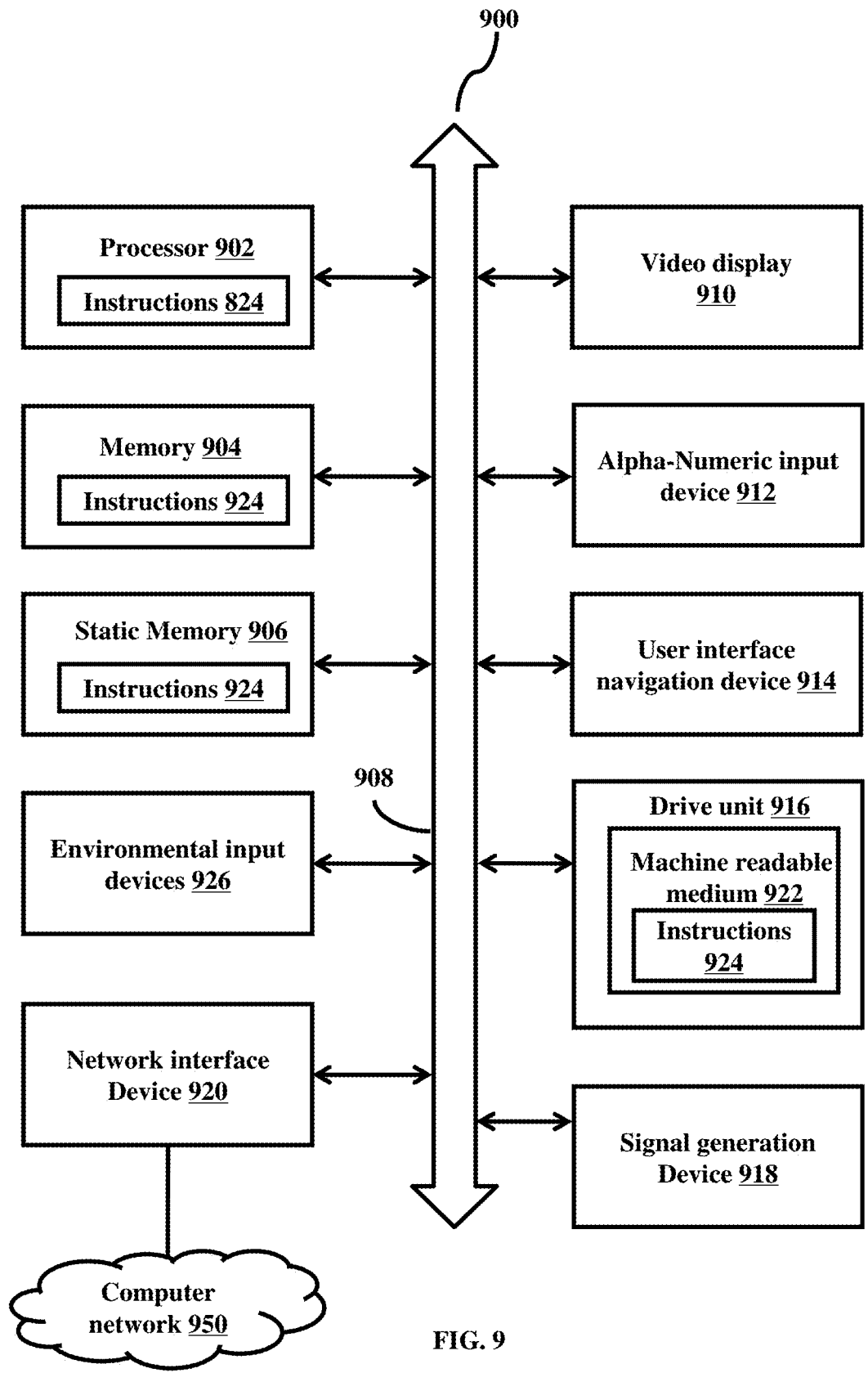
FIG. 9 is a block diagram of a machine in the example form of a computer system within which instructions for causing the machine to perform any one or more of the methodologies discussed herein may be executed.

FIG. 9 is a block diagram of a machine in the example form of a computer system within which instructions for causing the machine to perform any one or more of the methodologies discussed herein may be executed.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920. The computer system 900 may also include a environmental input device 926 that may provide a number of inputs describing the environment in which the computer system 900 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 924 may further be transmitted or received over a computer network 950 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C #, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method performed by a computer system for negotiating discount offers and thereby generating discount coupons over a network on negotiated terms, the computer system comprising at least a processor, wherein the computer-implemented method comprises:

establishing, by the processor, an offer channel for secure communication between one or more users and a plurality of businesses over the network;

enabling, by the processor, publishing offers on the offer channel, the offers comprising discount price, discount validity, and discount terms and conditions;

setting, by the processor, a set of negotiation rules for the offers on the offer channel, the set of negotiation rules defined in an ordered sequence on the terms of the offers;

implementing, by the processor, privacy aware user identity mechanism, the privacy aware user identity mechanism comprising:

generating, by the processor, public identifiers and private identifiers to be associated with a user profile such that the public identifiers and the private identifiers are unique for a user of the one or more users and each of the public identifiers and private identifiers have unique association, the user profile including a private digital identity associated with the private identifiers and a public digital identity associated with the public identifiers, the private digital identity comprising private information associated with the user;

storing, by the processor, details of the user profile, social media, offer channel subscriptions, redemption, and preferences and transaction history associated with each user in a user database;

limiting, by the processor, access to the private digital identity of the user profile using the private identifiers, wherein email and phone in the user profile are at least a part of private attributes comprised in the private digital identity, thereby restricting disclosure of the private digital identity of the user profile to the plurality of businesses; and disabling, by the processor, access to the private identifiers using the public identifiers for the plurality of businesses and a redemption center, wherein the public identifiers are embedded in form of a short alphanumeric code appended to a short URL, and wherein the short URL represents an issuer system related to the user and the short alphanumeric code represents a unique identity of the user;

wherein the setting of the set of negotiation rules for the offers comprises setting acceptance rules to provide criteria for accepting or denying user provided offer terms associated with a user in a counteroffer, setting exception rules based in part on the user profile and history information to accept or deny the user provided offer terms, wherein the exception rules allow decisions based on user profile attributes using the privacy aware user identity mechanism, wherein applicability of the exceptional rules is assessed based in part on values of the user profile attributes without sharing the user profile with the plurality of businesses, the exception rules include limiting values around the user profile attributes and actual user profile, and values of the user profile attributes used for the limiting values are not shared with the plurality of businesses, setting qualification rules to evaluate to provide the counteroffer to the user provided offer terms or to decline the user provided offer terms, ordering the acceptance rules and the exception rules in a sequential manner such that the exception rules are evaluated in an event the acceptance rules do not provide an acceptable decision, and ordering the acceptance, exception and qualification rules in a sequential manner such that the qualification rules are evaluated in an event the acceptance and the exception rules do not provide the acceptable decision;

initiating, by the processor, interactions among the one or more users and the plurality of businesses for negotiating terms of the offers, based on the implemented privacy aware user identity mechanism, by countering the offers with modified terms and ending the negotiation by accepting or declining the offers;

negotiating the offers on behalf of the plurality of businesses by applying the set of negotiation rules over the user provided offer terms;

transmitting, by the processor, coupons and coupon entitlement associated with the user, to the redemption center and the plurality of businesses; and permitting the user to avail the coupons by providing the public digital identity at the redemption center, wherein coupons registered against the user profile associated with the public digital identity across all channels are fetched and are availed by retrieving cart products and manufacturers and applying the coupons that match the products, wherein querying is performed in real time for list of entitled coupons corresponding to the public digital identity, valid for the redemption center from where a query was made;

storing, by the processor, the coupons, the offer terms, the public identifiers associated with the user, business associations, transaction history, coupon redemption details and offer association in a coupon database, allowing, by the processor, download and view of the coupons by the user of the one or more users; and allowing, by the processor, the plurality of businesses to retrieve, validate and redeem the coupons based in part on the public identifiers of the user.

2. The computer-implemented method as stated in claim 1, wherein establishing the offer channel further comprises:

registering the plurality of businesses to create the offer channel for publishing the offers;

allowing the plurality of businesses to register with the offer channel for publishing offers;

displaying a list of channels available for subscription to the user; and allowing users to subscribe to the offer channel to receive the offers and negotiate the terms of offers.

3. The computer-implemented method as stated in claim 2, wherein the publishing of the offers comprises:

describing the offers using offer terms which include discount, duration, validity and other conditions defined in the offers along with description.

4. The computer-implemented method as stated in claim 1, wherein the privacy aware user identity mechanism further comprises:

making the public identifiers available to the plurality of businesses and the redemption center to perform operations related to the coupons.

5. The computer-implemented method as stated in claim 4, wherein the public identifiers and private identifiers represent the public digital identity and the private digital identity of the user respectively, wherein the public digital identity is represented as a short code embedded inside a Uniform Resource Locator (URL), and wherein the URL is used by the business and the redemption center for establishing the public digital identity of the user, wherein the URL is represented as one of a bar code and a Quick Response Code.

6. The computer-implemented method as stated in claim 5, wherein the negotiation of the terms of the offer is done using the public digital identity provided to the user.

7. The computer-implemented method as stated in claim 1, wherein the negotiation of the offer by the user comprises:

the user accepting the terms of offer listed by the business in the offer or counteroffer;

the user declining the terms of offers listed by the business in the offer or the counteroffer; and the user presenting the counteroffer to the business with the modified terms.

8. The computer-implemented method as stated in claim 1, wherein negotiating the offer on behalf of the plurality of businesses further comprises:

analyzing, by the processor, the user presented counteroffer using the acceptance rules to evaluate acceptability of the offers;

analyzing, by the processor, the user presented counteroffer using the exception rules to evaluate acceptability of the offer, in the event the counteroffer is not acceptable based on the acceptance rules;

analyzing, by the processor, the user presented counteroffer using the qualification rules to evaluate acceptability of the offer, in the event the counteroffer is not acceptable based on the exception rules; and declining, by the processor, the counteroffer in the event the counteroffer is not acceptable based on the qualification rule.

9. The computer-implemented method as stated in claim 8, wherein in the event of acceptability of the offers:

creating the coupon, on behalf of the business, for accepted terms of offer and assigning the coupon the public digital identity of the user;

assigning the public identity notification of the coupon assignment;

sending the coupon and the notification to a device attached to the public digital identity; and sending the coupon and the public digital identity to the business and/or the redemption center.

10. The computer-implemented method as stated in claim 9, wherein the coupon is personalized for each of the user and each of the user has unique coupon including different terms of offer based on the negotiation.

11. The computer-implemented method as stated in claim 10 and further comprising:

allowing the user to see the coupon on the device; and allowing the user to redeem the coupon.

12. A system for negotiating discount offers and generating discount coupons over a network, the system comprises:

a network;

an offer channel using the network to facilitate secure communication between one or more users and a plurality of businesses;

a computer system comprising a processor and a memory, the processor configured to perform:

enabling the plurality of businesses to set rules for negotiation and publish the offers, the offers comprising discount price, discount validity, and discount terms and conditions;

initiating interaction of the one or more users for negotiating offer terms with the plurality of businesses and receiving coupons based on accepted offer terms, wherein the offer terms are negotiated by countering the offers with modified terms and ending the negotiation by accepting or declining the offers; and implementing privacy aware user identity mechanism comprising:

generating public and private identifiers to be associated with a user profile such that the public and private identifiers are unique for a user of the one or more users and each of the public and private identifiers have unique association, the user profile including a private digital identity associated with the private identifiers and a public digital identity associated with the public identifiers, the private digital identity comprising private information associated with the user;

storing details of the user profile, social media, offer channel subscriptions, redemption, and preferences and transaction history associated with the user in a user database;

limiting access to the private digital identity of the user profile using the private identifier, wherein email and phone in the user profile are at least a part of private attributes comprised in the private digital identity; and disabling access to the private identifier using the public identifier for the plurality of businesses and the redemption center, wherein the public identifier is is embedded in form of a short alphanumeric code appended to a short URL, and wherein the short URL represents an issuer system related to the user and the short alphanumeric code represents a unique identity of the user;

allowing the one or more users to download and view the coupons; and allowing the plurality of businesses to retrieve, validate and redeem the coupon based on the public digital identity of the user;

one or more redemption centers to provide the one or more users to avail the coupon with public digital identity, wherein the coupons registered against user identity across all channels are fetched and are availed by retrieving cart products and manufacturers and applying the coupons that match the products, wherein querying is performed in real time for list of entitled coupons corresponding to the public identity, valid for the redemption center from where the query was made, wherein setting negotiation rules comprises setting acceptance rules to provide criteria for accepting or denying user provided offer terms associated with the user in a counteroffer, setting exception rules based in part on the user profile and history information to accept or deny the user provided offer terms, wherein the exception rules allow decisions based on user profile attributes using the privacy aware user identity mechanism, wherein applicability of the exceptional rules is assessed based in part on values of the user profile attributes without sharing the user profile with the business, the exception rules include limiting values around the user profile attributes and actual user profile, and values of the user profile attributes used for the limiting values are not shared with the plurality of businesses, setting qualification rules to evaluate to provide the counteroffer to the user provided offer terms or to decline the user provided offer terms, ordering the acceptance and the exception rules in a sequential manner such that the exception rules are evaluated in an event the acceptance rules do not provide an acceptable decision, and ordering the acceptance, exception and qualification rules such that the qualification rules are evaluated in an event the acceptance and the exception rules do not provide the acceptable decision; and a coupon database for storing issued coupons, the offer terms, user association the public identity, business associations, transaction history, coupon redemption details and offer association.

13. The system as stated in claim 12 and the processor further configured to perform:

generating offer channels and register with existing offer channel for publishing the offers such that the one or more users can subscribe and negotiate the offer terms with the business;

storing the offer channels, associated with business, historical transactions and properties in a channel database;

allowing the business to create, publish, and manage offers on the offer channels and set up rules for negotiation; and storing the terms of offers and the rules for negotiation along with transaction history in the offer and rules database.

14. The system as stated in claim 12 and the processor further configured to perform:

allowing the one or more users to register, create profile, associate social media profile, validate social media handles and locators and create public and private identity of the users; and storing the profile, associated social media profile, the public and private identity of the users, the associated offer channels, the transaction history, users preference and users rating for the offers in a user database.

15. The system as stated in claim 12 and the processor further configured to:
allowing the users to interact and negotiate with the plurality of businesses for the offer terms.

16. The computer-implemented method as stated in claim 1, wherein the private digital identity is a unique and secure identifier to the user profile and the public digital identity is a public locator to the user profile as a short Uniform Resource Locator, and wherein the public digital identity does not reveal any details of the user.

17. The computer-implemented method of claim 1, wherein the user can redeem the coupon by solely disclosing the public digital identity to the redemption center.

\* \* \* \* \*